United States Patent [19]

Pellegrini et al.

[11] Patent Number: 4,463,382
[45] Date of Patent: Jul. 31, 1984

[54] AUTOMATIC, REMOTE SIGNAL SOURCE SELECTOR

[76] Inventors: Bruno Pellegrini, 40 Burtis Ave., Yonkers, N.Y. 10701; David E. Arnold, 13 Blauvelt St., Nanuet, N.Y. 10954

[21] Appl. No.: 358,205
[22] Filed: Mar. 15, 1982
[51] Int. Cl.³ ............................................. H04N 5/44
[52] U.S. Cl. .................................................. 358/181
[58] Field of Search .............................. 358/86, 181

[56] References Cited

U.S. PATENT DOCUMENTS

| | | | |
|---|---|---|---|
| 3,484,548 | 12/1969 | Kowal | 358/181 |
| 4,097,899 | 6/1978 | Yu | 358/181 |
| 4,109,280 | 8/1978 | Dash | 358/86 |
| 4,276,562 | 6/1981 | Stewart | 358/86 |
| 4,312,016 | 1/1982 | Glaab | 358/181 |

Primary Examiner—Michael A. Masinick

[57] ABSTRACT

A device consisting of a circuit which senses the state of an appliance, power on or power off, and a switch, usually remotely located, suitable for handling RF or video signals, which is controlled by said circuit for use in the selection of program material to be processed and/or displayed by a television receiver, video monitor or other device is disclosed. This device facilitates the use of video games, home computers and the like when it is desired that the display device be connected to more than one signal source.

This abstract is not to be taken either as a complete exposition or as a limitation of the present invention, however, the full nature and extent of the invention being discernable only by reference to the entire disclosure.

4 Claims, 2 Drawing Figures

AUTOMATIC, REMOTE SIGNAL SOURCE SELECTOR

BACKGROUND OF THE INVENTION

This invention relates generally to a device which causes the input signal of an appliance to be switched as a result of monitoring the condition of a second appliance.

It is a common occurrence these days that a television receiver is used as a display device for such electronic appliances as video games, home computers and the like. It is usually also desired that the television receiver be used to view regular commercial broadcasts or programs available on cable services. When such conditions arise a manual switch is generally used to select the signal source that the television is to use. The switch output is connected to the antenna terminals of the television and the two switch inputs, generally available, are connected to the antenna downlead and the video game output, for example. This switch is generally located behind the television receiver. When normal programmming is to be viewed, the switch is in a position so that the antenna downlead is connected to the television antenna terminals. When the video game is used, the person is required to grope behind the television in order to locate the switch and throw its handle into the position that causes the video game output to be connected to the television antenna terminals. At the end of the video game session, the television and game units are turned off, frequently without restoring the position of the manual switch. The next time programming is to be viewed the user will turn on the television receiver and since the switch was left in the game position, no programming can be viewed until the person reaches around the back of the television and puts the switch in the antenna position. The procedure of changing the position of the switch is further hampered where the television receiver is a large console type requiring a longer reach or where other furniture is nearby or when the television receiver is in a shelf unit thus reducing the access.

Another problem arises when multiple devices, a video game and home computer for example, are connected to one television using a plurality of switches of the type described. In this configuration in addition to reaching around the back of the television, the correct switch must be located and further, when the device to be viewed is at the end of the chain of switches, those switches between the device and the television must all be in the proper position.

In view of the above it is apparent that the present type of switch is not well suited for its intended purpose.

SUMMARY

A general object of this invention is to provide a device which will automatically cause the appropriate signal source to be connected to the antenna terminals by monitoring the state of an appliance thus eliminating the difficulty and inconvenience associated with the manual selection of the proper switch position.

Another object of this invention is to provide a device which eliminates the ambiguity of selecting proper switch positions when a plurality of devices is connected to a single television.

This is accomplished by providing a device consisting of a part for transmitting current from an AC source to a controlling receptacle and a switching part for selecting a signal source. A sensing circuit is placed in series with the controlling receptacle so that it can be determined whether the controlling device has been turned on or off by the user. The state of the sensing circuit causes a relay to switch the appropriate signal to the television.

BRIEF DESCRIPTION OF THE DRAWINGS

Other more specific objects and advantages of this invention will become apparent when reference is made to the following description considered in conjunction with the drawings wherein.

DESCRIPTION OF THE PREFERRED EMBODIMENT

Figure 1:
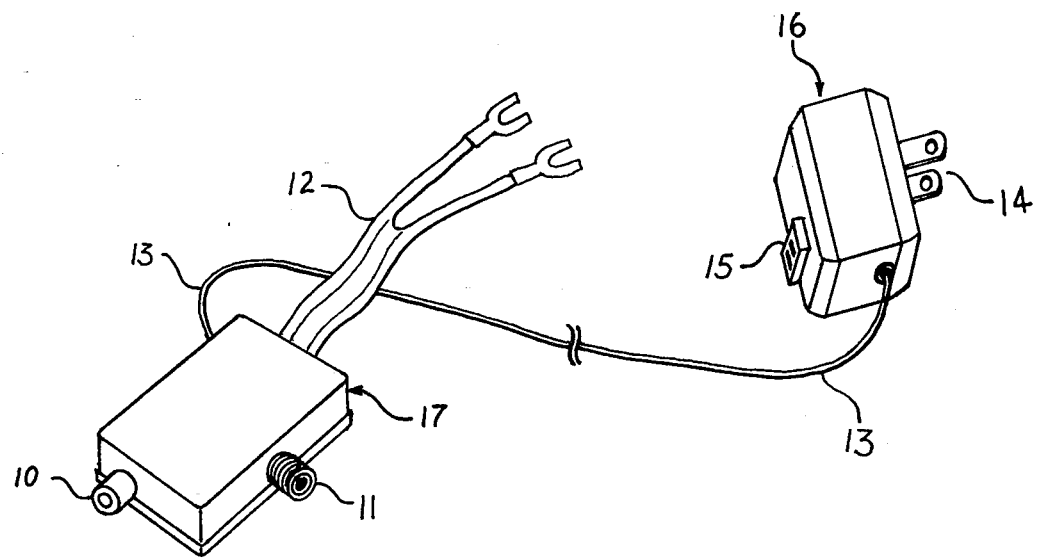
FIG. 1 is a perspective view of one embodiment of the present invention.

For the purposes of promoting an understanding of the principles of the invention, reference will now be made to the embodiment illustrated in the drawings and specific language will be used to describe same. It will nevertheless be understood that no limitation of the scope of the invention is thereby intended.

Referring to FIG. 1, there is illustrated the invention consisting of unit 16 connected to unit 17 by two conductor cable 13. A typical application of this invention is as follows:

Unit 16 would be plugged directly into a standard AC receptacle by means of plug 14. The power plug of a video game unit would be plugged into receptacle 15 and would get power from same, while the video game's RF output cable would be plugged into jack 10. Twin lead 12 would be connected to the antenna terminals of a television receiver and connector 11 would mate with an antenna downlead or a cable television service lead.

Figure 2:
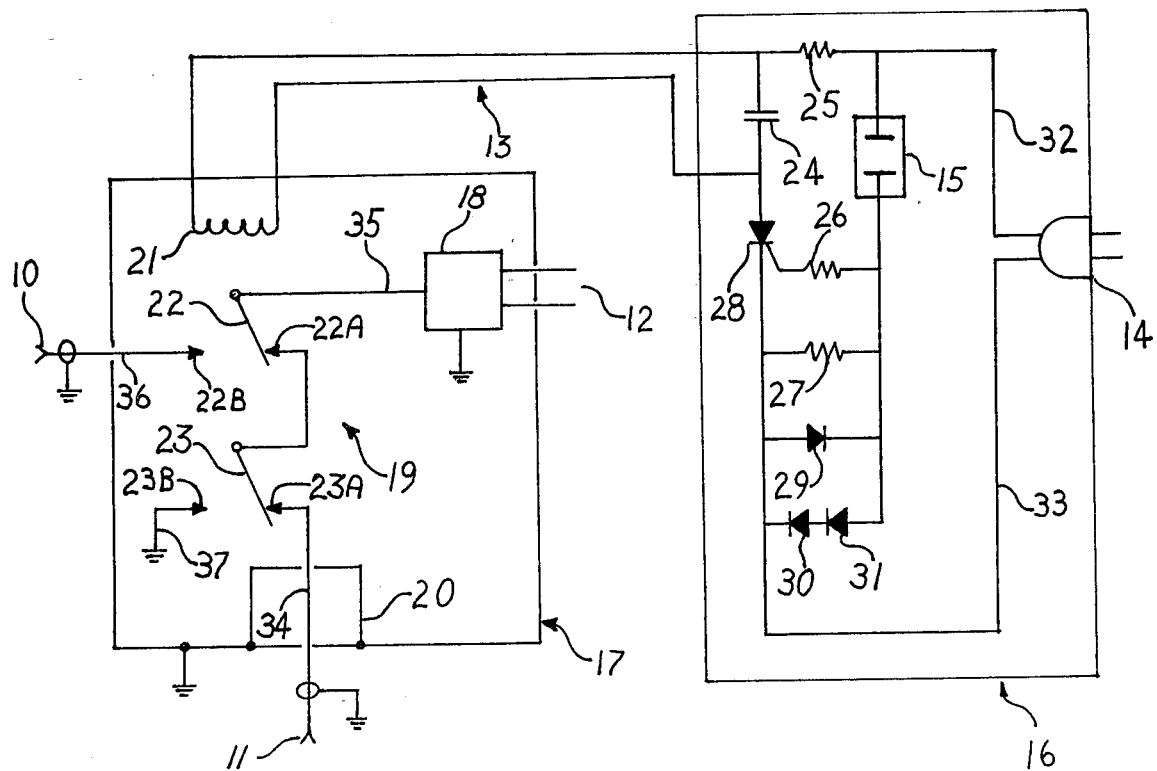
FIG. 2 is a schematic diagram illustrating one embodiment of an automatic switch constructed in accordance with the teachings of this invention.

The operation of the invention as disclosed in FIG. 2 is as follows:

When the video game unit, hereafter referred to as controlling unit, plugged into receptacle 15 is turned on the current needed for its operation flows from plug 14 to receptacle 15 and thus to the controlling unit by means of conductor 32 and resistor 27 in series with conductor 33. The current used by the controlling unit results in a voltage drop across resistor 27 which in turn causes current to flow in the gate circuit of SCR 28 through current limiting resistor 26. Diodes 30 and 31 limit the voltage drop across resistor 27 to a nominal 1.4 V thereby minimizing the reduction in available operating voltage to the controlling unit while permitting sufficient voltage drop on resistor 27 to allow current to flow in the gate circuit of SCR 28. SCR 28 enters the conductive state as a result of the current in its gate circuit and causes capacitor 24 to charge through current limiting resistor 25. SCR 28 remains in the conductive state until the beginning of the next half cycle of the AC power at which time SCR 28 is reverse biased. Capacitor 24 is thus prevented from discharging as a result of the AC power polarity reversal. During this half cycle diode 29 limits the reduction in available operating voltage to the controlling device to a nominal 0.7 V. The voltage on capacitor 24 is impressed on relay coil 21 in unit 17 by means of two conductor cable 13 causing switch blade 22 to move away from stationary contact 22A and to stationary contact 22B while simultaneously causing switch blade 23 to move away from stationary contact 23A and to stationary contact 23B. The voltage on capacitor 24 is maintained by charging as described until such time as the controlling unit is turned off. When this happens SCR 28 remains in the non conductive state and capacitor 24 discharges through relay coil 21 and two conductor cable 13. When the voltage on capacitor 24 falls below the minimum relay operating voltage the spring biased switch blades 22 and 23 return to the position shown in FIG. 2 making electrical contact with stationary contacts 22A and 23A respectively.

As will be understood by those skilled in the art, it is seen that when the controlling device is in the off state, switch members 22 and 23 of relay 19 are in the position shown in FIG. 2. This causes the signal from the antenna downlead, which is present at connector 11, to be electrically connected to the television antenna terminals, which are connected to twin lead 12 by means of conductor 34, switch members 23A, 23, 22A, 22, conductor 35, impedance matching transformer 18 and twin lead 12 and viewing of program material is possible. When the controlling device is in the on state, the signal generated by the controlling device, which is present at jack 10, is electrically connected to the television antenna terminals by means of conductor 36, stationary contact 22B, switch blade 22, conductor 35, impedance matching transformer 18 and twin lead 12 thus permitting the viewing of the material generated by the controlling device. Using the invention in the configuration described, the signal generated by a video game, for example, will be automatically connected to a television without any action required of the user when the video game is turned on. When the game is turned off, the normal antenna connection to the television is restored.

Relay 19 is a DPDT type and is used in the configuration shown in FIG. 2 to achieve higher isolation. When the signal present at connector 11, which is from an antenna downlead or cable service, is connected to the television, the device which would generate the signal present at jack 10, the controlling device, is off and therefore no signal exists at jack 10 which could interfere with the signal being connected to the television. However when the controlling device is on and its output signal, which is present at jack 10, is connected to the television, the signal at connector 11 is still present. To prevent interference with the signal connected to the television, contact 22A is grounded through switch blade 23, contact 23B and conductor 37. This configuration allows an inexpensive relay to be used while providing sufficient isolation that the relatively strong signal typically available from cable services, which could be present at connector 11, will not interfere with the signal generated by the controlling device. To further increase isolation the conductor 34 which carries the potentially powerful and interfering signal, is housed in a metal shield 20 which is electrically connected to the metal cabinet of unit 17.

Typically, video games and home computers are a stepdown power transformer to obtain the low voltages necessary for their operation. It is often the case that the power switch in these devices does not break the circuit in the primary side of the power transformer but rather it interrupts the secondary side. As a result the primary circuit is connected to the AC power even if the device is turned off. This results in current flowing in the primary side of the transformer although since no power is being consumed the current is out of phase with the AC voltage. Because of the ever present current on the primary side of the power transformer, detecting current to determine the state of the device is not sufficient. The circuit illustrated in FIG. 2 as being in unit 16 determines the state of the device plugged into receptacle 15 by comparing the current flowing to receptacle 15 with the voltage at said receptacle thus determining power consumption. This is accomplished as follows:

If the current flowing into receptacle 15 is in phase with the voltage at said receptacle, then when SCR 28 goes into conduction as a result of the gate circuit current caused by the voltage on resistor 27 and limited by resistor 26, capacitor 24 charges through resistor 25 with the AC voltage as the source. When the current is out of phase with the voltage SCR 28 goes into conduction for a smaller portion of the AC power cycle and at a point in the cycle when the AC voltage is closer to the zero crossing and therefore has a smaller value. The result of the shorter SCR conduction time and lower AC voltage during the SCR conduction time results in a modest voltage on capacitor 24 which is below the minimum working voltage for relay coil 21 and thus results in no actuation of the relay. This allows the controlling device to be of the type where the power switch is in the secondary side of the power transformer while still allowing the use of controlling devices where the power switch is on the primary side of the power transformer as well as devices that have no transformer at all.

When selecting components to construct the power sensing circuit the following guidelines can be consulted:

Resistor 27 must be of a large enough resistance so that when the minimum controlling device current is drawn the voltage drop across it is sufficient to cause SCR 28 gate current to flow and result in putting SCR 28 into the conducting state. Resistor 27 has no bearing on the maximum current that the controlling device can draw.

Diodes 29, 30 and 31 should be able to handle the maximum control device current and thus will determine this quantity.

Resistor 26 is chosen to limit the SCR gate current.

Capacitor 24 must be of large enough capacitance to supply current to the relay coil for the half cycles when the SCR is not conducting, without a drop in voltage large enough to cause the relay to return to its rest state.

Resistor 25 should be of low enough resistance to cause sufficient current flow to recharge capacitor 24 to the maximum relay coil voltage but not so low as to cause the capacitor to be charged to an excessively high voltage.

It is clear to those skilled in the art, that a device can be constructed using this invention which contains a plurality of the function provided by the device shown in FIG. 2, where the output of a source selector switch is one of the inputs of the next source selector switch thus providing the following benefits when more than one appliance, for example a video game and a home computer, utilize a common television for display purposes. When any one appliance is turned on its output signal is automatically connected to the television. If more than one appliance is turned on simultaneously then the signal generated by the appliance which is on and whose signal output is connected to the signal selector switch which is electrically closest to the television antenna terminals is connected to said terminals. In addition, the conductors which carry the output signals of the appliances cannot be shorted together regardless of whether the appliances are on or off.

It is to be understood that the invention is not limited to the particular details of construction of the illustrative embodiment herein described, nor in its application in use to the uses particularly described, but is to be construed broadly within the purview of the claims.

What is claimed is:

1. A switching device for automatically selecting from a plurality of signals supplied by a plurality of signal sources, which signal is to be supplied to a display device, comprising:
    a plug for mating with an AC power outlet and a receptacle for accepting the power plug of a first signal source and supplying power to the first signal source;
    a pair of input signal ports for receiving signals from the first signal source and a second signal source;
    an output for supplying a selected signal to the display device;
    a switch for supplying the signal from one of the input ports to the output;
    where the signal supplied to the output port by the switch is selected based on the operative state of the first signal source.

2. A device as set forth in claim 1 where the portion of said device that contains said signal source inputs and said output is contained in a first housing and the portion of said device that contains said plug and said receptacle is contained in a second housing interconnected to the first housing by means which allow said housings to be at a distance from each other while said device is operating.

3. A device as set forth in claim 1 or claim 2 where power consumption by said first signal source is monitored to determine said operative state.

4. A switching device for automatically selecting from a plurality of signals supplied by a plurality of signal sources, which signal is to be supplied to a display device, comprising:
    a plug for mating with an AC power outlet and a plurality of receptacles for accepting the power plugs of a plurality of signal sources and supplying power to the plurality of signal sources;
    a plurality of signal input ports for receiving signals from the plurality of signal sources;
    an output for supplying a selected signal to the display device;
    a switch for supplying the signal from one of the input ports to the output;
    where the signal supplied to the output port by the switch is selected based on the operative states of the plurality of signal sources.

* * * * *